United States Patent
Schmidt

(10) Patent No.: US 9,718,133 B2
(45) Date of Patent: Aug. 1, 2017

(54) ADJUSTABLE HOLDER FOR A CUTTING TOOL

(71) Applicant: WHIZCUT OF SWEDEN AB, Helsingborg (SE)

(72) Inventor: Erik Schmidt, Helsingborg (SE)

(73) Assignee: WHIZCUT OF SWEDEN AB, Helsingborg (SE)

( * ) Notice: Subject to any disclaimer, the term of this patent is extended or adjusted under 35 U.S.C. 154(b) by 118 days.

(21) Appl. No.: 14/399,248

(22) PCT Filed: May 6, 2013

(86) PCT No.: PCT/SE2013/050501
§ 371 (c)(1),
(2) Date: Nov. 6, 2014

(87) PCT Pub. No.: WO2013/169187
PCT Pub. Date: Nov. 14, 2013

(65) Prior Publication Data
US 2015/0125224 A1    May 7, 2015

(30) Foreign Application Priority Data

May 7, 2012   (SE) ...................................... 1250460

(51) Int. Cl.
*B23B 29/02*   (2006.01)
*B23B 27/16*   (2006.01)
(Continued)

(52) U.S. Cl.
CPC ........ *B23B 27/1688* (2013.01); *B23B 29/046* (2013.01); *B23B 29/10* (2013.01);
(Continued)

(58) Field of Classification Search
CPC ............. Y10T 82/2585; Y10T 82/2587; Y10T 82/2589; Y10T 408/907; Y10T 408/95;
(Continued)

(56) References Cited

U.S. PATENT DOCUMENTS 3,176,998 A  *  4/1965  Parker .................... B21D 28/34
                                                    234/131
3,189,976 A     6/1965  Pickril
(Continued)

FOREIGN PATENT DOCUMENTS

CN      201223954 Y    7/2008
CN      101670447 A    3/2010
(Continued)

OTHER PUBLICATIONS

English Abstract, JPH10138011A, 2 pages.
(Continued)

*Primary Examiner* — Sunil K Singh
*Assistant Examiner* — Nicole N Ramos
(74) *Attorney, Agent, or Firm* — Ware, Freesola, Maguire & Barber LLP

(57) ABSTRACT

A holder for a cutting tool for processing of workpieces has a first part for holding a cutting tool (150), a second part (120) to which the first part is fastened, and a fastening element (140). An adjustment element adjusts the position of the first part in relation to the second part. The first and second parts have a first bore and a second bore for receiving the fastening element and a recess (118, 128) for receiving the adjustment element. The first part has an abutment surface (115) placed onto a contact surface (122) of the second part, such that the central axes (A-A) for the first and second bores become parallel. The abutment surface of the first part and the contact surface of the second part are (Continued)

inclined in relation to the feeding axis (G-G) of the work piece towards the cutting tool (150).

11 Claims, 5 Drawing Sheets

(51) Int. Cl.
  *B23B 29/10* (2006.01)
  *B23B 29/04* (2006.01)
(52) U.S. Cl.
  CPC ..... *B23B 2260/004* (2013.01); *Y10T 407/222* (2015.01); *Y10T 407/2214* (2015.01); *Y10T 407/2218* (2015.01); *Y10T 407/2222* (2015.01)
(58) Field of Classification Search
  CPC ....... Y10T 408/9098; Y10T 408/90993; Y10T 407/2214; Y10T 407/2218; Y10T 407/222; Y10T 407/2222; B23B 29/0345; B23B 29/034; B23B 29/03432; B23B 29/03435; B23B 29/03439; B23B 29/03442; B23B 29/03446; B23B 29/03489; B23B 29/03478; B23B 29/0348; B23B 29/03492; B23B 29/10; B23B 29/08; B23B 29/046; B23B 27/1688; B23B 2260/004
  See application file for complete search history.

(56) References Cited

U.S. PATENT DOCUMENTS

| | | | |
|---|---|---|---|
| 3,236,125 A | | 2/1966 | Lundgren |
| 3,656,859 A * | | 4/1972 | Rietzler ............... B23D 77/048 407/114 |
| 3,808,655 A * | | 5/1974 | Foster .................... B23B 27/06 407/109 |
| 3,980,443 A * | | 9/1976 | McCreery ........... B23B 27/1666 407/106 |
| 4,030,176 A * | | 6/1977 | Michonski ............ B23B 29/046 407/107 |
| 4,101,239 A * | | 7/1978 | Wohlhaupter .... B23B 29/03407 407/37 |
| 4,227,841 A | | 10/1980 | Hoover |
| 4,242,018 A * | | 12/1980 | Schurfeld ......... B23B 29/03407 408/157 |
| 4,595,320 A * | | 6/1986 | Berner ............. B23B 29/03403 407/37 |
| 5,066,175 A * | | 11/1991 | Newman ............. B23B 51/0009 279/2.03 |
| 5,330,297 A * | | 7/1994 | Engstrand ......... B23B 29/03407 408/153 |
| 5,555,784 A | | 9/1996 | Muendlein et al. |
| 5,642,651 A * | | 7/1997 | Von Haas ............... B23B 29/04 407/76 |
| 5,868,530 A * | | 2/1999 | Shouse .................. B23B 27/00 407/101 |
| 5,961,259 A * | | 10/1999 | Ziegler ............. B23B 29/03407 407/37 |
| 2006/0230890 A1 | | 10/2006 | Little |
| 2009/0087268 A1 | | 4/2009 | Schäfer et al. |
| 2009/0238651 A1* | | 9/2009 | Nguyen .................. B23B 29/04 407/104 |
| 2010/0254774 A1 | | 10/2010 | Hecht |

FOREIGN PATENT DOCUMENTS

| | | |
|---|---|---|
| DE | 4436779 A1 | 6/1969 |
| DE | 2644068 A1 | 5/1978 |
| DE | 20 2011 103 407 U1 | 10/2011 |
| GB | 2081143 A | 2/1982 |
| JP | S48-035484 U | 4/1973 |
| JP | S61-75912 U | 5/1986 |
| JP | H7-501494 A | 2/1995 |
| JP | H10-138011 A | 5/1998 |
| JP | 2008-542048 A | 11/2008 |

OTHER PUBLICATIONS

English Abstract, DE2644068A1, 3 pages.
English Abstract, CN201223954Y, 2 pages.
English Abstract, CN101670447A, 2 pages.
Office Action with Search Report, dated Nov. 25, 2015, counterpart application No. CN201380033111.6, 6 pages.
International Search Report for PCT/SE2013/050501, dated Aug. 27, 2013, 4 pages.
Extended European Search Report, Application No. EP13787010.1-1709 / 2846950, PCT/SE3013050501, Dec. 23, 2015, 12 pages.
English Abstract, Bibliographic data, and including machine translation of JP S48-035484U (foreign patent document cite No. 1 above), 6 pages in total.
English Abstract, Bibliographic data, including machine translation of JP S61-75912U (foreign patent document cite No. 4 above), 6 pages in total.
Notice of Rejection, dated Apr. 11, 2017, in Japanese counterpart application 2015-511412, citing U.S. Pat. Application Cite No. 1 above as document D1, and citing Foreign Patent Document Cites No. 1-4 above as documents D2-D5 (see paragraph bridging pages 3 and 4), 4 pages in total.

* cited by examiner

ADJUSTABLE HOLDER FOR A CUTTING TOOL

CROSS REFERENCE TO RELATED APPLICATIONS

This application is a National Stage of PCT International application no. PCT/SE2013/050501, filed 6 May 2013, which claimed priority in Swedish Patent application no. 1250460-1, filed 7 May 2012, the contents of these applications being incorporated herein by reference.

TECHNICAL FIELD

The following invention belongs to the field of holders for cutting tools. It is especially related to a holder for cutting tools for processing of workpieces where the position of the cutting tool is adjustable.

BACKGROUND

Holders for cutting tools for lathes are known in the field. In recent years, lathes with sockets for cutting tools with round shafts for horizontal processing of workpieces have become more and more common, such as machines for turning along. During turning along, the workpiece is held in place by means of a clamping sleeve in the same way as during traditional turning.

Flatbed lathes have also become more common. It is often common for all of these machine types which are adapted for mass production to have axially mounted and often round holders fixed in a height direction. Tools that are to machine towards a center of the workpiece need in most cases to be adjusted with an accuracy of 0.01 mm in order to achieve the best product and the longest wear time.

Regardless of turning technology, it is very important to be able to position the cutting tool in a machine as simply and as accurately as possible in relation to the workpiece. For that purpose, holders for cutting tools have been developed which comprise one or more pieces that are movable and adjustable. Adjustment of the position of the cutting tool is often performed via adjustment of a part of the holder by means of adjustment screws and fixed by one or more locking screws.

An adjustable plate is most commonly used which can be attached to a corresponding fixed plate where one or two screws move one plate vertically or radially in relation to the longitudinal axis of the workpiece, while four or even more screws are used as locking screws in order to attach the plate to the fixed plate. The problem with such solutions is their complexity, making the adjustment of the position of the cutting tool time consuming. Moreover, such holders are expensive to produce and result in lower stability and precision.

Another solution is shown in U.S Published patent application number US 2006/0230890 where a holder is composed of a detachable part to which a cutting tool can be attached and a fixed part. The detachable and the fixed part have a bore through which a locking screw can pass and thus lock the first part against the second part. The cutting tool can in that case only be adjusted in the radial direction, but not in the height direction. Even if this solution uses considerably less components than the solutions described earlier, the options for accurate adjustment of the position of the cutting tool are limited.

It would thus be desirable to find a solution which simplifies the adjustment of the position of the cutting tool in a holder and which moreover achieves a more accurate adjustment of that position. It would also be desirable to apply such a solution to older machines where the position of the cutting tool needs to be adjusted in the height direction.

SUMMARY OF THE INVENTION

The present invention aims at solving at least some of the problems with previously known technology.

One solution is achieved by a holder for a cutting tool for processing workpieces, comprising a first part with a device for holding a cutting tool, and a second part to which the first part is adapted to be fastened. A fastening element is provided to fasten the first to the second part. An adjustment element is provided to adjust the position of the first part in relation to the second part, where the first and second parts have at least a first bore in the first part for receiving the fastening element and a second bore in the second part, and a recess for receiving the adjustment element. The first part further has an abutment surface adapted to be placed onto a contact surface of the second part, such that central axes for the first and the second bore become parallel. Further, the abutment surface for the first part and the contact surface for the second part are inclined with respect to a feeding axis of the workpiece toward the cutting tool. A central height of the cutting tool is adjusted by the adjustment element which is configured to define a distance between the adjustment element and the recess in the second part by turning the adjustment element. The fastening element is configured to move the first part in the direction of the central axis towards the second part and towards the adjustment element by turning.

Advantageous embodiments are described further below.

According to one aspect of the invention, the solution is achieved by a holder for cutting tools for processing of workpieces. The holder comprises a first part with means for holding a cutting tool and a second part to which the first part is adapted to be attached to. Furthermore, the holder further comprises a fastening element designed to fasten the first part to the second part and also an adjustment element designed to adjust the position of the first part in relation to the second part. The first part and the second part comprise at least a first bore for receiving the fastening element and a second bore and a recess for receiving the adjustment element. The first part further comprises an abutment surface configured to be placed onto a contact surface of the second part, such that the central axes of the first and second part become parallel such that the abutment surface for the first part and the contact surface for the second part are inclined in relation to a feeding axis for the workpiece towards the cutting tool.

The advantage of this solution is simple assembly, fixing and adjustment of the two parts in the holder, such that as accurate a position as possible is achievable for the cutting tool. At the same time the holder according to the present invention gives a very stable construction such that the cutting forces at the cutting tool are balanced. The holder according to the present invention is also simple to manufacture and thus cost-effective. Finally, the holder is in principle suitable for any machine for processing of workpieces where accuracy of the position of the cutting tool is relevant.

DETAILED DESCRIPTION OF THE INVENTION

Figure 1:
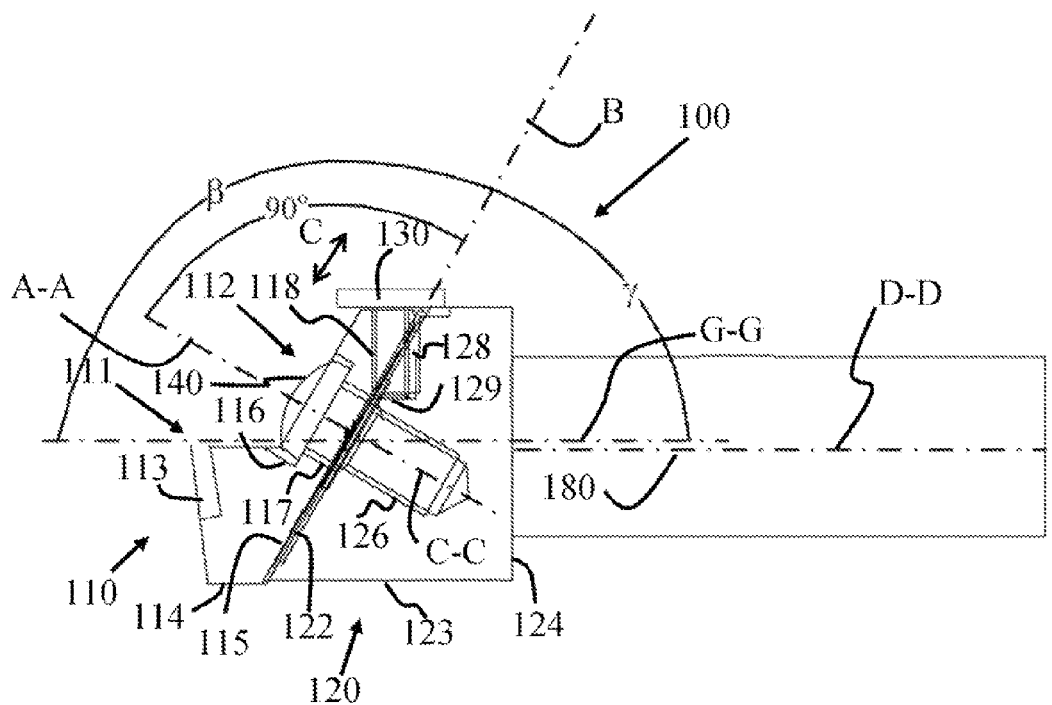
FIG. 1 shows a cut-away view of one embodiment of the holder for a cutting tool.

FIG. 1 shows a holder for a cutting tool 100 according to a first embodiment. The holder 100 comprises a first removable part 110 and a second part 120 to which the first part 110 is adapted to abut. The second part 120 may further comprise a shaft 180 which can be rectangular, cylindrical or have any other shape as long as one can identify a central axis D-D in it. The shaft 180 is adapted to be attached to a machine for processing of different types of workpieces. The advantage of a holder with a removable first part is that it is easy to change the cutting tool once it is worn out.

The first part 110 of the holder 100 which in this view and this embodiment has a form similar to a golf club head comprises a base portion 111 and an elongated portion 112. The abutment surface 115 of the elongated portion 112 forms an outer angle β with the axis G-G which defines the feeding direction for the workpiece to be processed. The base portion 111 in the first part 110 comprises a base surface 114 which in the embodiment in FIG. 1 is plain, but may have any shape.

Furthermore, the first part 110 comprises a first through bore 116 and a second through bore 117 produced in the elongated portion 112 of the first part 110. The position of the two through bores 116 and 117 in the first part is however not limited to any specific area on the elongated portion 112, but may be situated close to the base portion 111 for stability reasons. The two through bores 116 and 117 are adapted to receive a fastening device which in this example is a locking screw 140. However, other types of fastening devices are also possible, such as bolts, buttons and similar devices. In the embodiment in FIG. 1, the first bore hole 116 is somewhat wider than the second bore 117 in order to be able to receive the head of the locking screw, while the second bore 117 in terms of its size is adapted to let the locking screw 140 pass through it.

The bores 116 and 117 in the first part 110 and the second part 120 may be made to be round or oval shaped. They may also be somewhat greater than the head of the locking screw 140 in order to allow for play when adjusting the position of the first part 110. It is also possible to have an embodiment where one part or one half of the bore 116 is exposed. This is shown by the dotted line 119 in FIG. 2a. The advantage of such an embodiment of the bore 116 is that a greater play for the locking screw 140 is allowed and thus also a greater adjustment interval for the first part 110 in relation to the second part 120. One other advantageous effect can be reached by designing the bore 116 such that it is somewhat inclined in relation to the central axis A-A for the bore 117 (see the bore 119' in FIG. 2b) or that a part of the bore 116 to the left of the central axis for the bore 117 is inclined in relation to the part of the bore 116 located to the right of the same bore as shown in FIG. 2b.

Figure 2A:
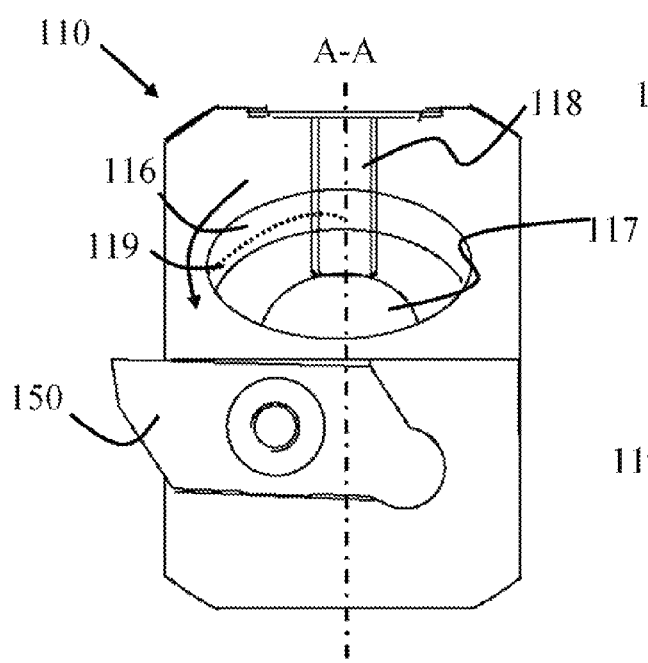
FIG. 2a shows a first variant of a first part of the holder for a cutting tool in a front view.
Figure 2B:
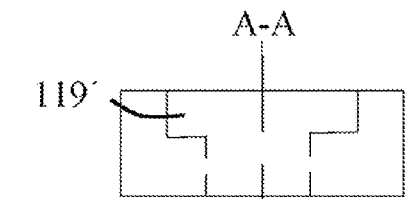
FIG. 2b shows a variant of the bore for a locking screw in the first part of the holder.
Figure 2C:
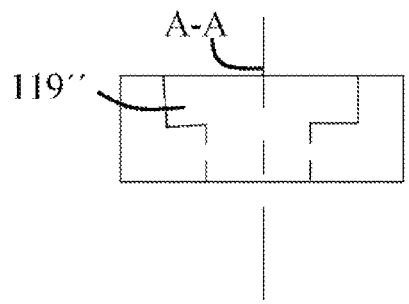
FIG. 2c shows another variant of the bore for a locking screw in the first part of the holder.

In the embodiments shown in FIGS. 2b and 2c, the head of the locking screw 140, during turning of the locking screw 140, earlier reaches the bottom of the side of the bore 119', 119" located higher up. Moreover, the tensile force during turning the locking screw 140 is concentrated towards the middle of the backside (see FIG. 6) of the first part 110.

The first part 110 also has a recess 113 for receiving a cutting tool 150. The cutting tool 150 may have any shape as long as it can be contained and fixed in the recess 113. The function of the cutting tool is processing of a workpiece (not shown) for example in a turning lathe or any other machine with a cutting function. As already mentioned earlier, the workpiece is fed to the cutting tool 150 in the direction of the G-G axis.

In FIG. 1, the first part 110 also has a third through bore 118 at an end of the elongated portion 112 adapted to receive an adjustment device that, in this embodiment is made up of an adjustment screw 130. The first part 110 is shown in more detail in FIG. 2a. The adjustment screw 130 is made such that its turning defines the interval within which the first part 110 may be adjusted in relation to the second part 120. This will be explained in more detail further below. The third through bore 118 and the adjustment screw 130 in FIG. 1 may advantageously be threaded.

The second part 120 in turn has a first bore 126 adapted to receive the locking screw 140 that is to pass through the through bores 116 and 117 in the first part when the first part 110 is to be attached to the second part 120. The first bore 126 is advantageously threaded when the attachment device is a threaded screw.

Moreover, the second part 120 has a recess 128 with a flat bottom 129 adapted to receive the adjustment device 130 which also passes through the third bore 118 in the first part 110.

In this embodiment, the first part 120 has two plain side surfaces 123 and 124 and a chamfered and inclined portion 122. The inclined portion 122 forms a contact surface for the abutment surface 115 of the first part when the first part 110 is to be attached to the second part 120 with the help of the locking screw 140. Moreover, the inclined portion 122 forms an inner angle γ with the feeding axis G-G of the workpiece.

In the following text, an explanation is given about how the removable first part 110 is fastened to the fixed second part 120.

As already mentioned earlier in the text, the abutment surface 115 of the elongated portion 112 forms an outer angle β with the axis G-G along which a workpiece is fed to the cutting tool 150 in the holder 100. The abutment surface 115 is adapted to abut the contact surface 122 of the second part. The inclined or leaning surfaces 115, 122 give an extended abutment and thus greater stability than the plain or vertical or horizontal surfaces described earlier.

Moreover, the inclined abutment surface 115 in the first part 110 and the contact surface 122 in the second part 120 provide a short distance to the lower side of the cutting tool 150.

If one wishes to adjust the central height of a cutting tool such as the central height for the cutting tool 150 in FIG. 2a, this may be done using the adjustment screw 130. A turning of the adjustment screw 130 defines the distance between the adjustment screw and the bottom 129 of the recess 128 in the second part 120. When turning the locking screw 140, the first part is moved towards the second part 120 in the direction of the second part 120 along the tapered plane and towards the adjustment screw 130. At the same time the adjustment screw is dragged towards the bottom 129 of the recess 128 in the second part 120. The final fastening of the first part 120 to the second part 120 is achieved by the locking screw 140 passing the through bores 116, 117 in the first part 110 and into the bore 126 in the second part 120 through turning of the locking screw 140 until the lower side of the adjustment screw 130 reaches the bottom 129 of the recess 128.

Depending on how great the distance is between the lower side of the adjustment screw 130 and the lower side 129 of the recess which has been adjusted by turning the adjustment screw 130, the position of the first part 110 may be adjusted to the desired accuracy in relation to the second part 120 in the direction of the arrow C. In FIG. 2a, the bore 118 is plain. When turning the locking screw 140 this means that the inclined surface 122 in the second part 120 concentrates the tensile force towards the center of the abutment surface 115 in the first part 110, giving a stable fastening of the first part 110 towards the second part 120 of the holder 100.

In the embodiment with an inclined bore 116 in relation to the center axis A-A (see FIG. 2b) of the bore 117, movement of the first part 110 towards the adjustment screw 130 is achieved at the same time as the tensile force is concentrated towards the center of the inclined portion 115 in the first part 110. A similar effect is achieved when one half of the bore 116 is inclined in relation to the center axis A-A of the bore 117 (see FIG. 2c). The concentration of the tensile force towards the center of the back side of the first part 110 may also be achieved by exposing a part of the wall of the bore 116, but in this case the forces during the turning of the locking screw are directed in the direction of the central axis A-A.

The above described variant of the first part 110 and the second part 120 achieves a very simple construction of the holder 100 with only one fastening device 140 in the form of a locking screw and an adjustment device in the form of an adjustment screw 130.

FIG. 2a shows the second part 110 in a front view. It is worth pointing out here that the central axis A-A for both bores 116 and 117 does not necessarily need to be aligned with the central axis C-C for the bore 126 in the second part 120 when the fastening device 140 is turned. It is also conceivable that they form a blunt angle or are parallel. The through bore 117 formed in the elongated portion 112 may for the sake of stability be placed near or slightly above the center of the inclined plane 115 in the first part in order to be able to compensate as effectively as possible for the cutting forces which the cutting tool 112 is encountering.

Figure 3:
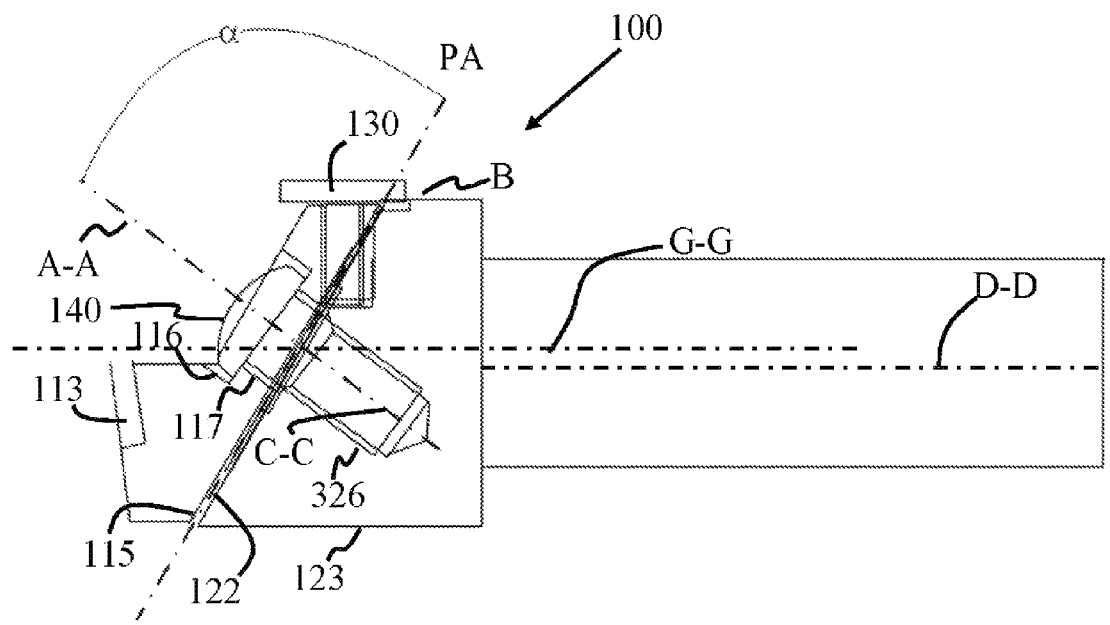
FIG. 3 shows a cut-away view of a second variant of the holder.

FIG. 3 illustrates another embodiment of the invention where the angle α between the plane PA in which the abutment surface 115 is located and the central axis A-A for both bores 116, 117 in the first part and the bore 126 in the second part 120 is located, is less than 90 degrees. Besides this difference, the embodiment of the holder 100 is very similar to the one presented in FIG. 1 earlier on. The inclined abutting surfaces have as earlier explained the advantage of an extended abutment surface and thus better stability.

Moreover, the angle α<90 degrees between the central axis A-A of the through bores 116, 117 in the first part 110 and the plane PA have the advantage of a different type of fastening of the first part 110 to the second part 120. During fastening, the locking screw 140 moves the first part 110 towards the adjustment screw 130 and the second part 120. Moreover, during turning of the locking screw 140, the first part also moves the adjustment screw 130 towards the bottom of the recess 129 as shown in FIG. 1. The difference here however is that the locking screw 140 during turning is locked at the adjustment screw 130 due to the inclined position of the bores 116, 117 and bore 326.

Figure 4:
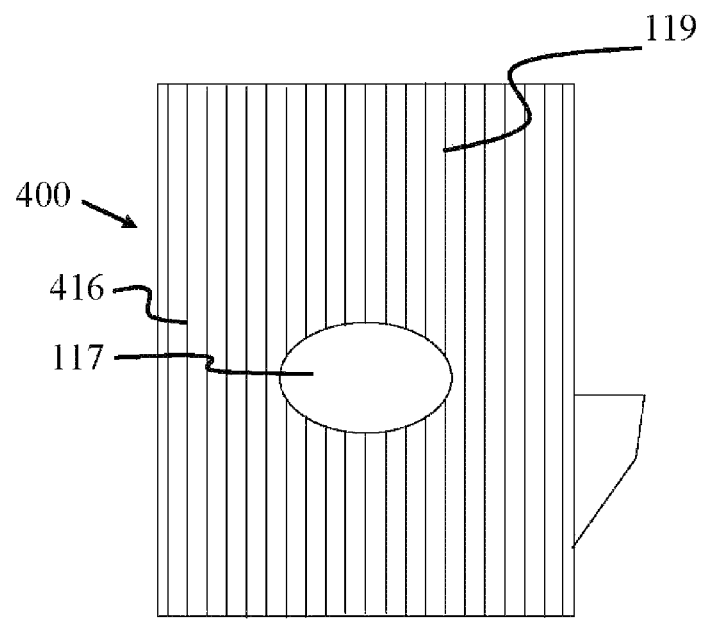
FIG. 4 shows the backside of the first part of the holder in FIGS. 1 and 3.

FIG. 4 illustrates the back of the first part 110 of the holder 100 in a front view with the through bore 117 visible. In this embodiment, the first part 110 has been equipped with a corrugated abutment surface 416. The abutment surface 122 of the second part may advantageously also be corrugated, such that movement of the first part in relation to the second part in the tapered plane is minimized. The backside may instead of the corrugated structure also have two or more grooves which are movable in corresponding protrusions on the contact surface of the second part (not shown).

Figure 5:
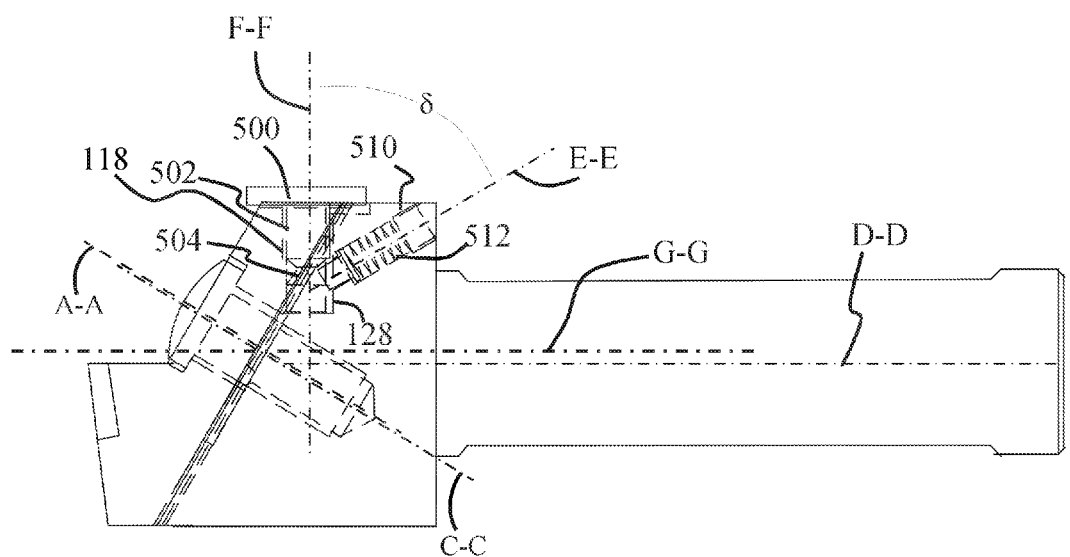
FIG. 5 shows a third variant of the holder in a side view.

FIG. 5 illustrates a third embodiment of the holder 100 where a modified adjustment device 500 is used along with a spring loaded piston 510 located inside the second part 120.

The modified adjustment device 500 which in this example is an adjustment screw 500 consists of a plain portion 502 and an inclined portion 504. The purpose of the inclined portion 504 is to receive an end of the spring loaded piston 510 that via a compression spring 512 pushes the adjustment screw 500 towards the lower part of the recess 128 in the second part 120. During turning of the locking screw 140, the first part 110 is moved towards the second part 120 and the locking screw 500. Moreover, the movement of the first part 110 also moves the adjustment screw 500 towards the bottom of the recess 128 as described earlier. Moreover, the spring loaded piston 510 presses the first part 110 and the adjustment screw 500 towards the second part 120. When the first part 110 has been locked to the second part 120 of the holder 100, the spring loaded piston 510 keeps the modified adjustment screw 500 in place and has a stabilizing effect on it. In FIG. 5 the central axis E-E for the spring loaded piston 510 and the central axis F-F for the third through hole in the first part 110 and the recess 128 in the second part 120 form an angle δ. The angle may advantageously be selected such that it has a maximum effect when fastening the first part 110 to the second part 120.

The inclined portion 504 may also be formed as a spherical protrusion, such that a spherical end of the spring loaded piston 510 may be held in such a recess of the adjustment screw (not shown).

Figure 6:
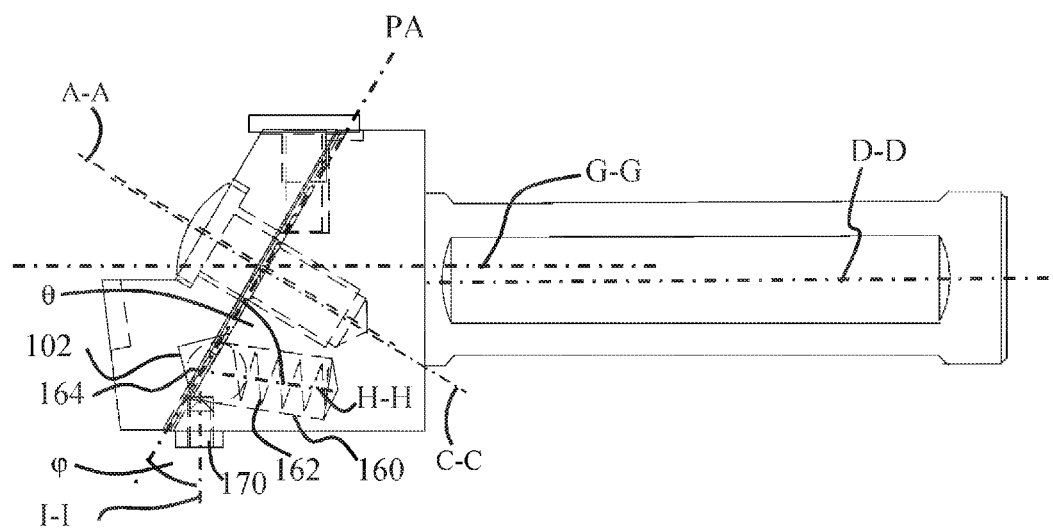
FIG. 6 shows a fourth variant of the holder in a side view.

FIG. 6 illustrates a fourth variant of the holder 100 in a cut-away view. In this case, the first part 100 has been equipped with a recess 102 adapted to receive a spring loaded sphere 164 which in turn is located in a fourth bore 160 in the lower portion of the second part 120. The spring loaded sphere is held in place by a second locking screw 170. Besides the stability advantages given by the spring loaded piston in FIG. 4, this variant is somewhat simpler to manufacture than the embodiment in FIG. 5 and the spring force is concentrated towards the first part 110 instead of the adjustment screw 500 in the solution in FIG. 5.

The central axis H-H for the fourth bore 160 may advantageously be chosen such that the angle θ between the central axis H-H and the plane PA gives maximum stability during turning of the second locking screw 170. The same is true for the angle φ between the central axis I-I of the second locking screw 170 and the plane PA.

Figure 7:
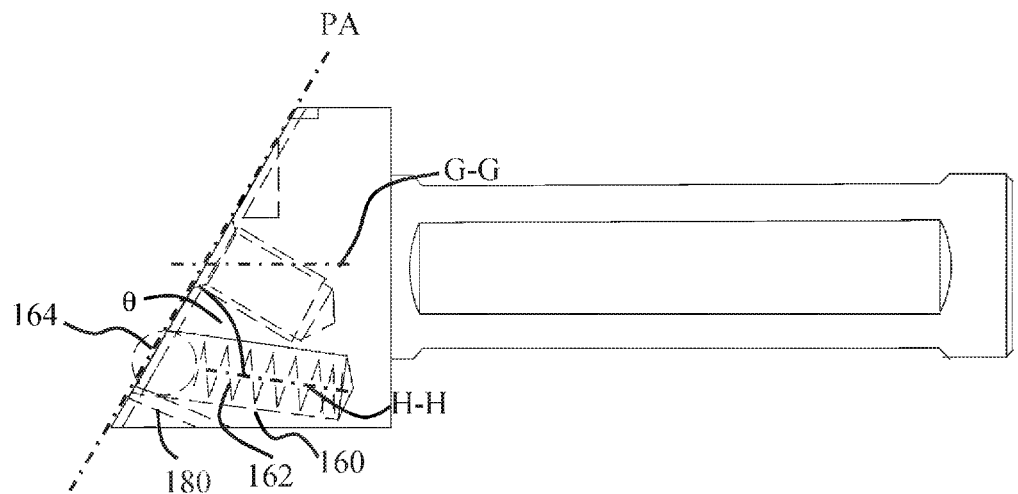
FIG. 7 shows a fifth variant of the holder in a side view.

FIG. 7 illustrates a fifth variant of the holder where only the second part 120 is shown. The first part 110 is still equipped with a recess (not shown) which in terms of its size is adjusted to receive the sphere 164. The difference to the embodiment in FIG. 6 is that the locking of the spring loaded sphere 164 is effected by a locking pin in the second part 120. The rest of the construction in FIG. 7 is very similar to the one in FIG. 6 having the same advantages as the latter.

Figure 8:
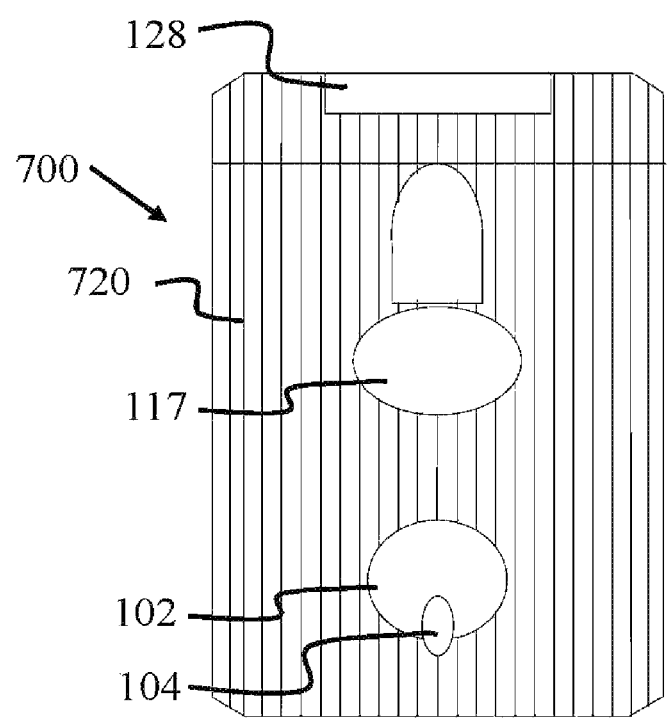
FIG. 8 shows the backside of the first part of the holder in FIG. 5.

FIG. 8 illustrates the backside 700 of the first part 110 from the embodiment in FIG. 7. The backside is analogous to the backside in FIG. 4 being corrugated 720 in order to be able to move against the abutment surface 122 in the second part which in turn is corrugated in a corresponding way to facilitate movement of the first part 110 in the second part 120 in the direction of the arrow C (see the arrow C in FIG. 1).

Moreover, the backside 700 comprises an elliptical through bore 117 through which the locking screw 140 is adapted to pass. Also, the backside 700 has a recess 102 which, similar to previous explanations, is adapted to receive a spring loaded sphere 164. Additionally, the backside 700 in the first part 110 comprises a recess 104 for receiving a locking pin from FIG. 7 which locks the movement of the sphere 164 inside the first part 110.

It is worth pointing out that the embodiments described earlier constitute only examples of the present invention and should not be construed as limitations of the present invention.

Even if the present invention is mentioned in the context of cutting tools for turning lathes, the holder as such is adapted to hold any type of cutting tool where the stability of the cutting tool is of importance. Thus the holder according to the present invention can be used to hold cutting tools for processing of small and elongated workpieces, but also bigger workpieces of in principle arbitrary size.

It is moreover worth stressing that even if the second part 120 in all the illustrated embodiments is connected to a shaft 180 of one or other shape, the invention works even without the presence of a shaft 180. The backside 124 of the second part 120 may itself be fixed in a machine for machining of workpieces without being connected to a shaft.

A skilled person may after reading of the detailed description together with the accompanying drawings realize that there exist more than the earlier described two embodiments of the present invention.

Ultimately, the scope of the invention is only limited by the scope of the patent claims.

The invention claimed is:

1. A Holder for a cutting tool for processing of workpieces, comprising:
   a first part configured to hold a cutting tool;
   a second part to which the first part is adapted to be fastened;
   a fastening element for fastening the first to the second part;
   an adjustment element for adjusting a position of the first part in relation to the second part;
   wherein the first part has a first bore and the second part has a second bore, wherein the first bore and the second bore receive the fastening element, and wherein the second part has a recess for receiving the adjustment element, and the first part has an abutment surface adapted to be placed onto a contact surface of the second part, such that central axes of the first bore and the second bore are parallel;
   wherein the abutment surface of the first part and the contact surface of the second part are inclined with respect to a feeding axis of the workpiece toward the cutting tool, defining an inclined plane;
   wherein a central height of the cutting tool is adjustable by the adjustment element being turnable to define a distance between the adjustment element and the recess in the second part, and wherein turning the fastening element moves the first part along the inclined plane towards the second part and in the direction of the central axes of the first bore and the second bore and towards the adjustment element;
   wherein the adjustment element has a straight portion and a chamfered portion, and
   wherein the second part further comprises a piston adapted to exert a pressure force on the chamfered portion of the adjustment element, to press the adjustment element towards the recess in the second part.

2. The holder according to claim 1, wherein turning the fastening element moves the first part towards the second part and towards the adjustment element, and also moves the adjustment element towards a bottom of the recess located in the second part.

3. The holder according to claim 1, wherein the piston is adapted to move the first part towards the adjustment element via the pressure force during fastening of the first part to the second part via the fastening element.

4. The holder according to claim 1, wherein the piston is spring-loaded by a compressed spring.

5. The holder according to claim 1, wherein the contact surface is inclined in relation to the feeding axis of the workpiece, by an inner angle less than 90 degrees.

6. The holder according to claim 1, wherein the central axis of the first bore in the first part is orthogonal to the abutment surface.

7. The holder according to claim 1, wherein the central axis of the second bore in the second part is orthogonal to the contact surface of the second part.

8. The holder according to claim 1, wherein the abutment surface is positionable on the contact surface of the second part, such that the central axes for the first and second bores in the first and second parts coincide.

9. The holder according to claim 1, wherein the abutment surface and the contact surface are corrugated.

10. A Holder for a cutting tool for processing of workpieces, comprising:
    a first part configured to hold a cutting tool;
    a second part to which the first part is adapted to be fastened;
    a fastening element for fastening the first to the second part;
    an adjustment element for adjusting a position of the first part in relation to the second part;
    wherein the first part has a first bore and the second part has a second bore and the second bore receives the fastening element, and wherein the second part has a recess for receiving the adjustment element, and the first part has an abutment surface adapted to be placed onto a contact surface of the second part, such that central axes of the first bore and the second bore are parallel;
    wherein the abutment surface of the first part and the contact surface of the second part are inclined with respect to a feeding axis of the workpiece toward the cutting tool, defining an inclined plane; and
    wherein a central height of the cutting tool is adjustable by the adjustment element being turnable to define a distance between the adjustment element and the recess in the second part, and wherein turning the fastening element moves the first part along the inclined plane towards the second part and in the direction of the central axes of the first bore and the second bore and towards the adjustment element, wherein the first part further comprises a first recess adapted to receive a spring loaded sphere configured to exert a pressure force on the first recess of the first part.

11. A Holder for a cutting tool for processing of workpieces, comprising:
a first part configured to hold a cutting tool;
a second part to which the first part is adapted to be fastened;
a fastening element for fastening the first to the second part;
an adjustment element for adjusting a position of the first part in relation to the second part,
wherein the first part has a first bore and the second part has a second bore, wherein the first bore and the second bore receive the fastening element, and wherein the second part has a recess for receiving the adjustment element, and the first part has an abutment surface adapted to be placed onto a contact surface of the second part,
wherein the abutment surface of the first part and the contact surface of the second part are inclined with respect to a feeding axis of the workpiece toward the cutting tool, defining an inclined plane,
wherein a central height of the cutting tool is adjustable by the adjustment element being turnable to define a distance between the adjustment element and the recess in the second part, and wherein turning the fastening element moves the first part along the inclined plane towards the second part and towards the adjustment element,
wherein the adjustment element has a straight portion and a chamfered portion, and
wherein the second part further comprises a piston adapted to exert a pressure force on the chamfered portion of the adjustment element, to press the adjustment element towards the recess in the second part.

* * * * *